Figure 1:
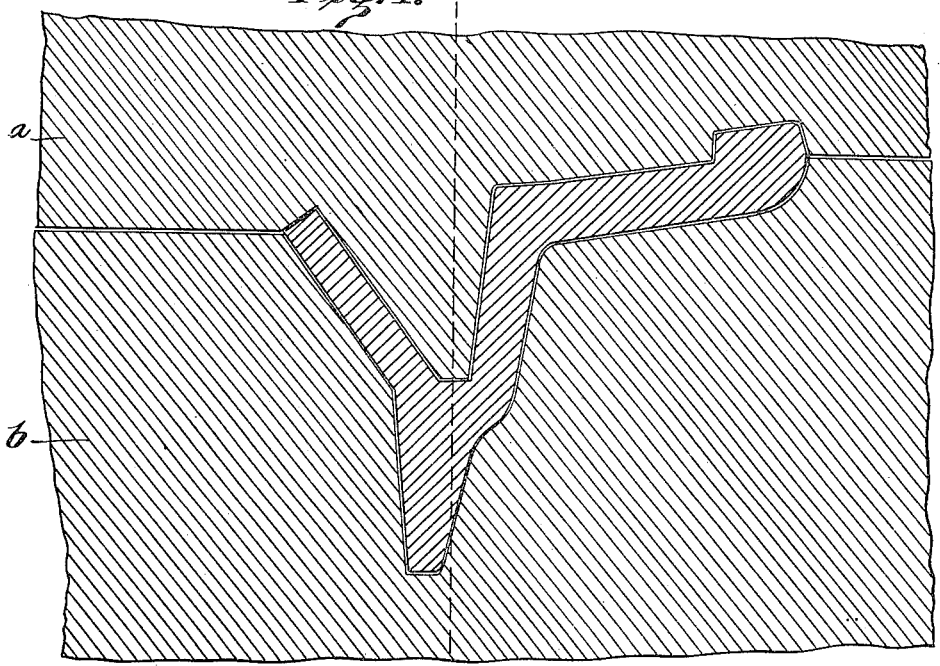

J. MISKO.
METHOD OF MAKING RAIL JOINTS.
APPLICATION FILED JAN. 20, 1912.

1,041,503.

Patented Oct. 15, 1912.
7 SHEETS—SHEET 1.

Witnesses: Inventor
Joseph Misko

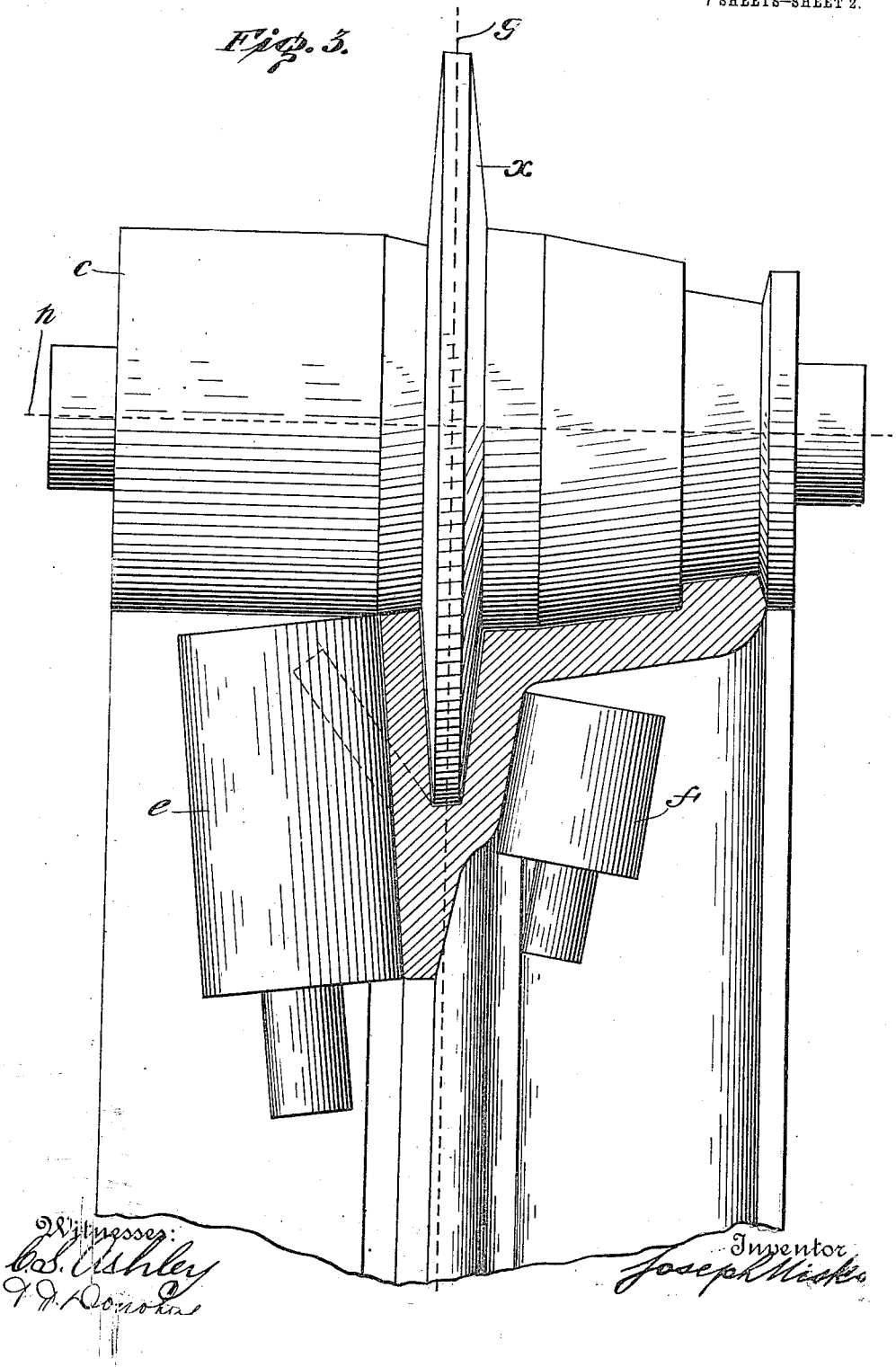

J. MISKO.
METHOD OF MAKING RAIL JOINTS.
APPLICATION FILED JAN. 20, 1912.
1,041,503.
Patented Oct. 15, 1912.
7 SHEETS—SHEET 3.
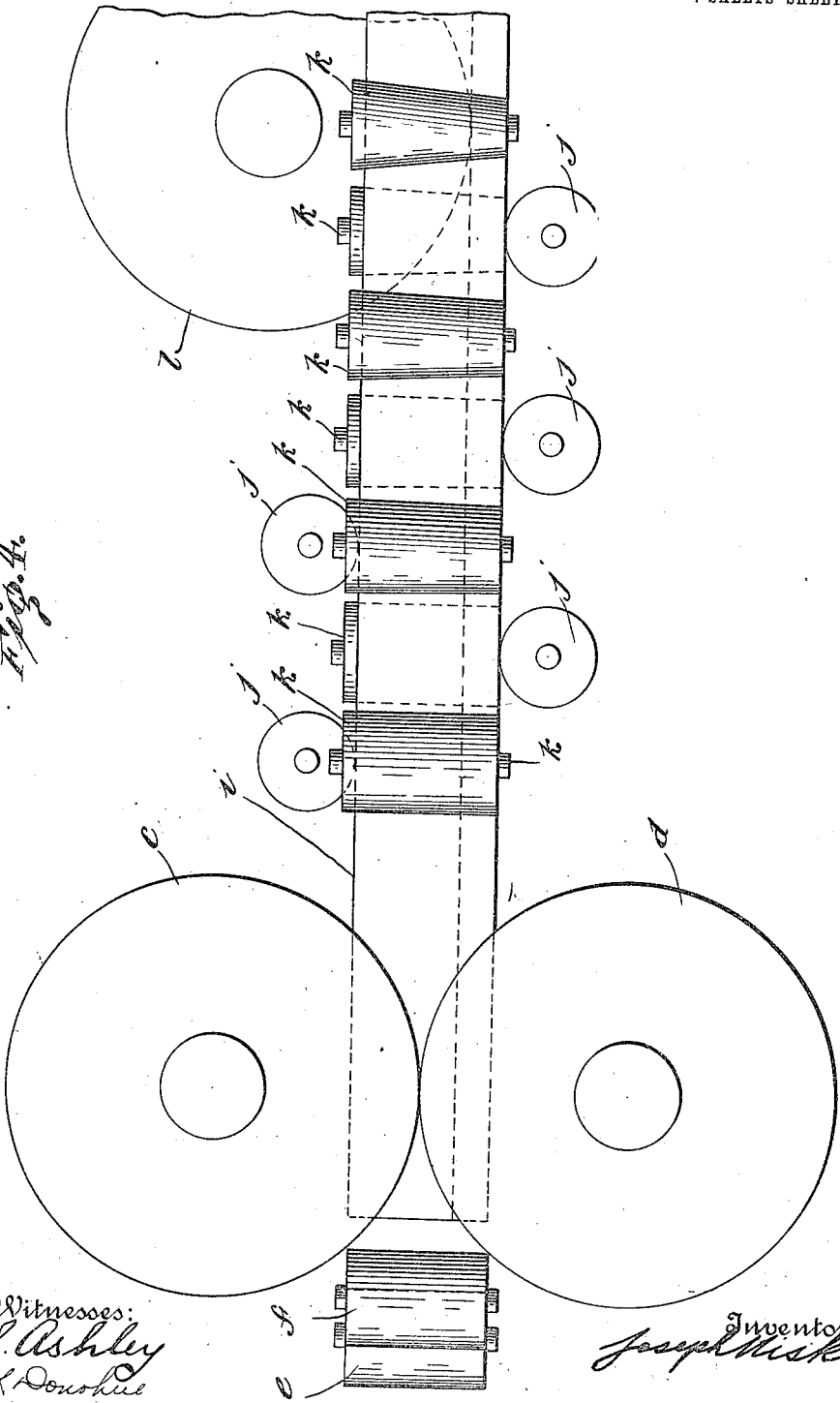

J. MISKO.
METHOD OF MAKING RAIL JOINTS.
APPLICATION FILED JAN. 20, 1912.
1,041,503.
Patented Oct. 15, 1912.
7 SHEETS—SHEET 4.
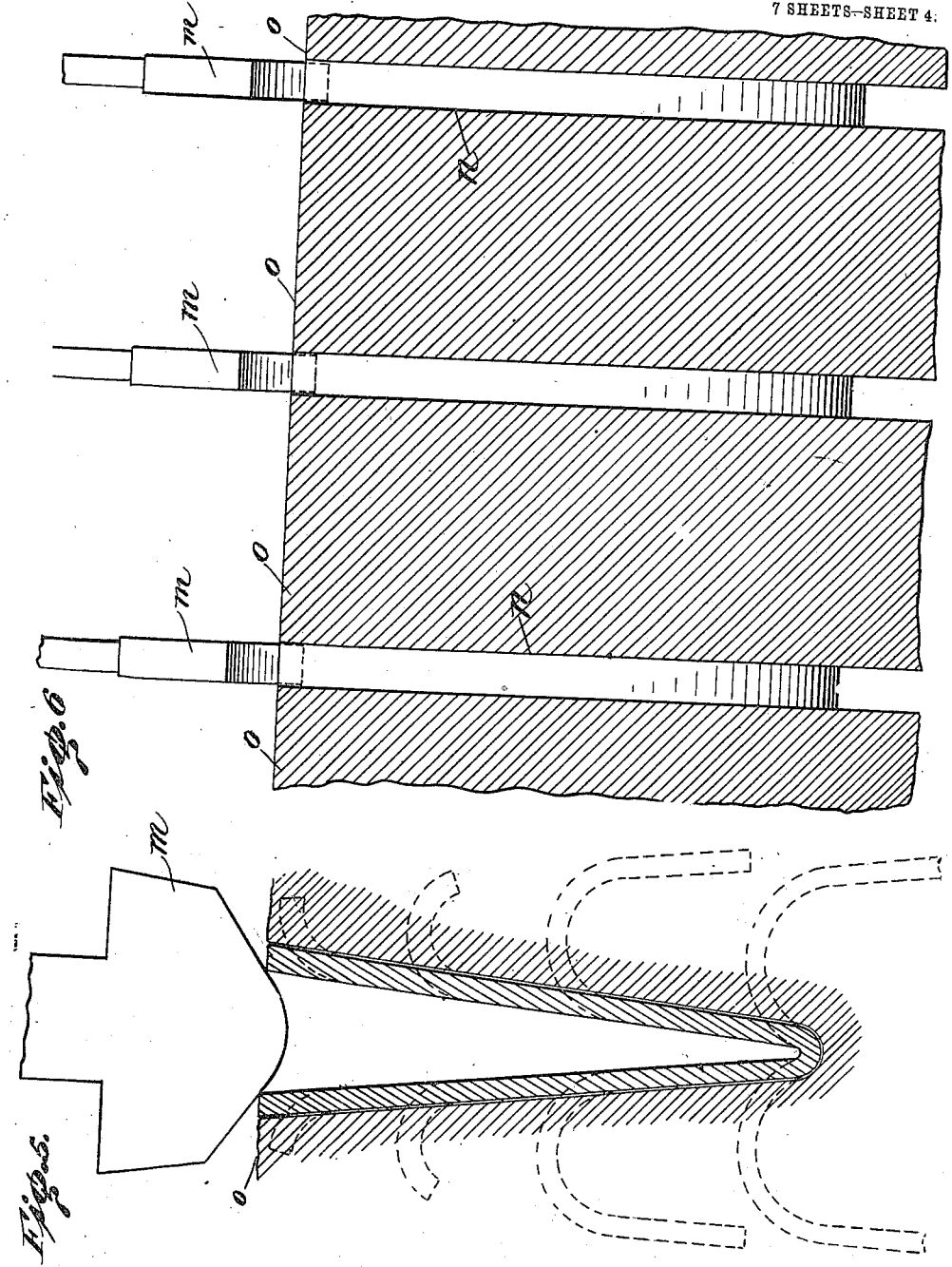
Witnesses:
C. S. Ashley
J. J. Donohue
Inventor
Joseph Misko

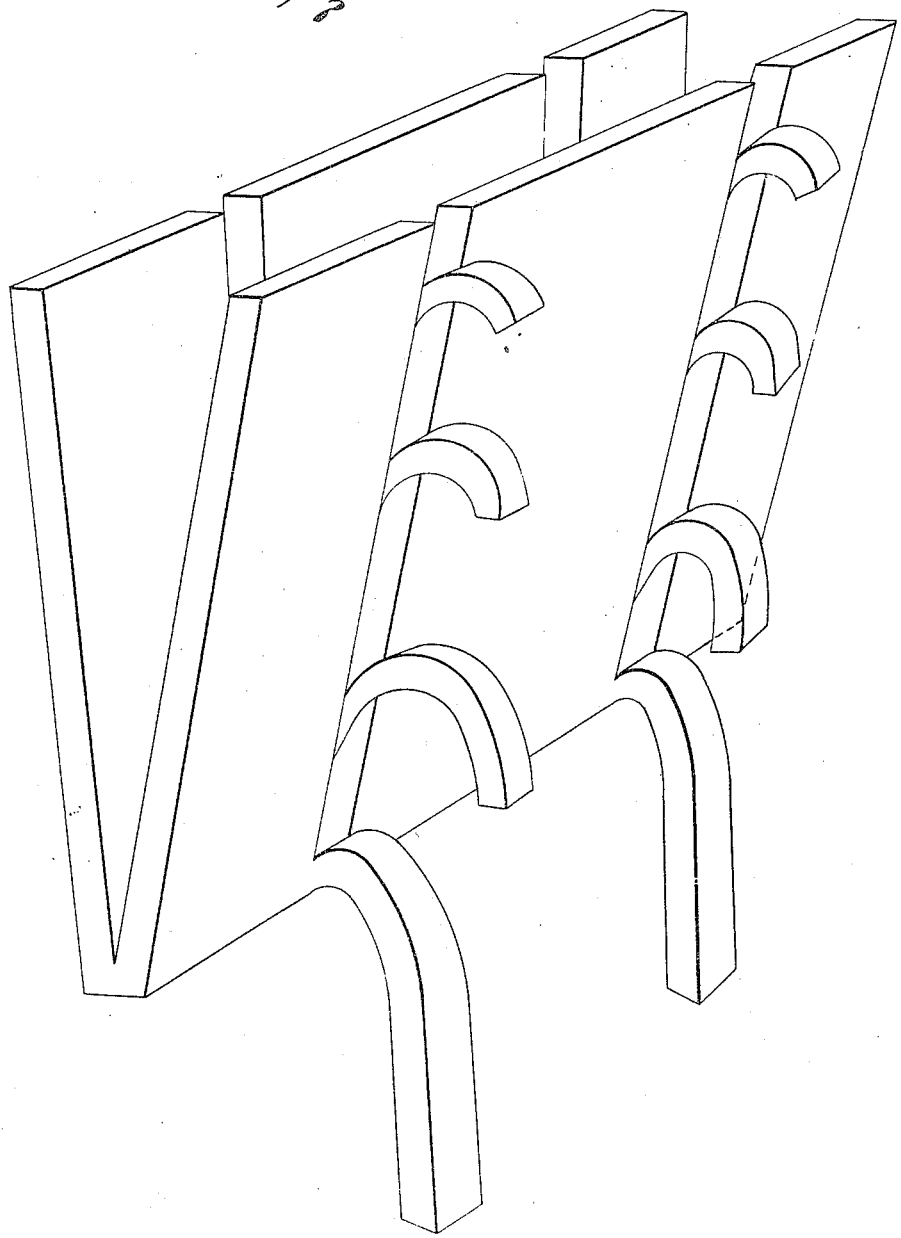

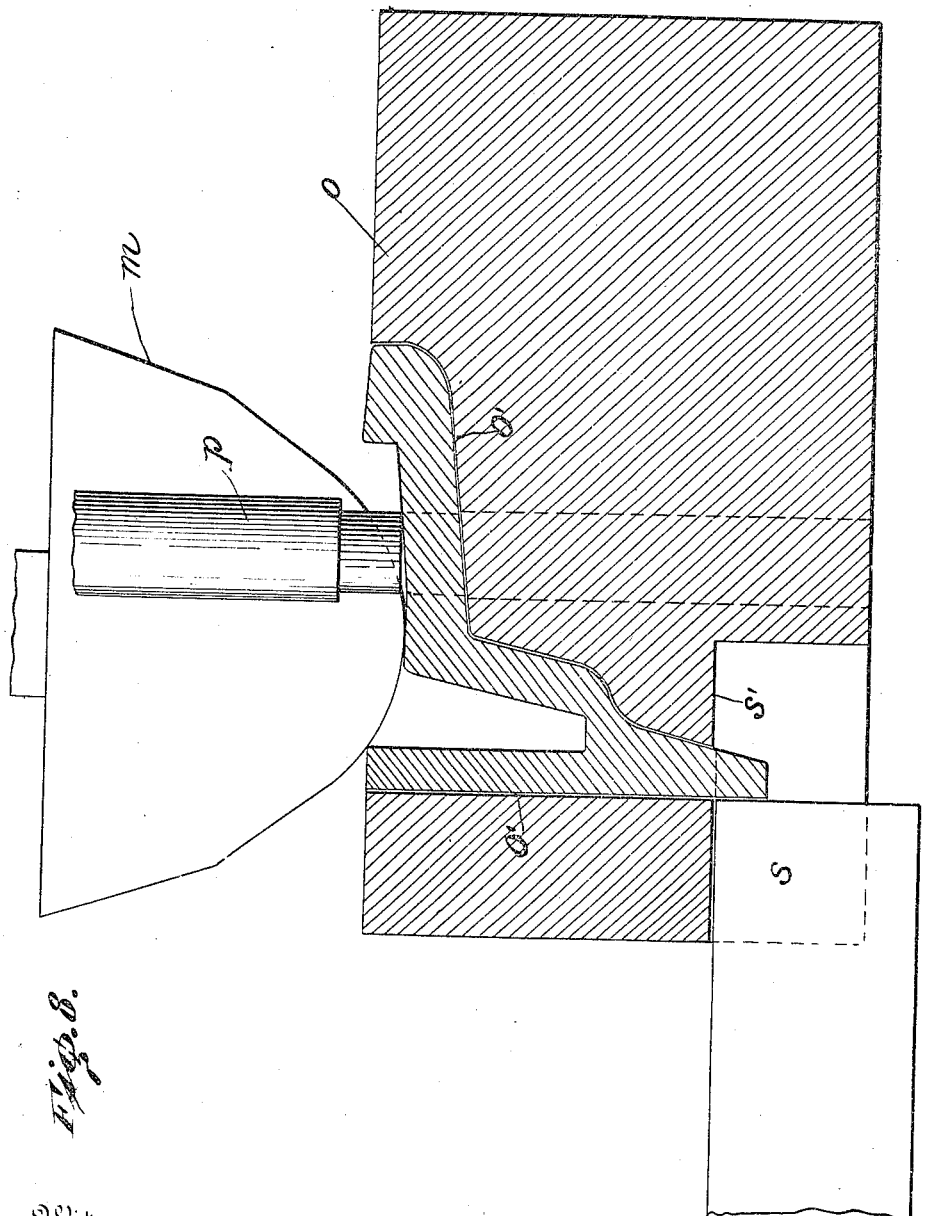

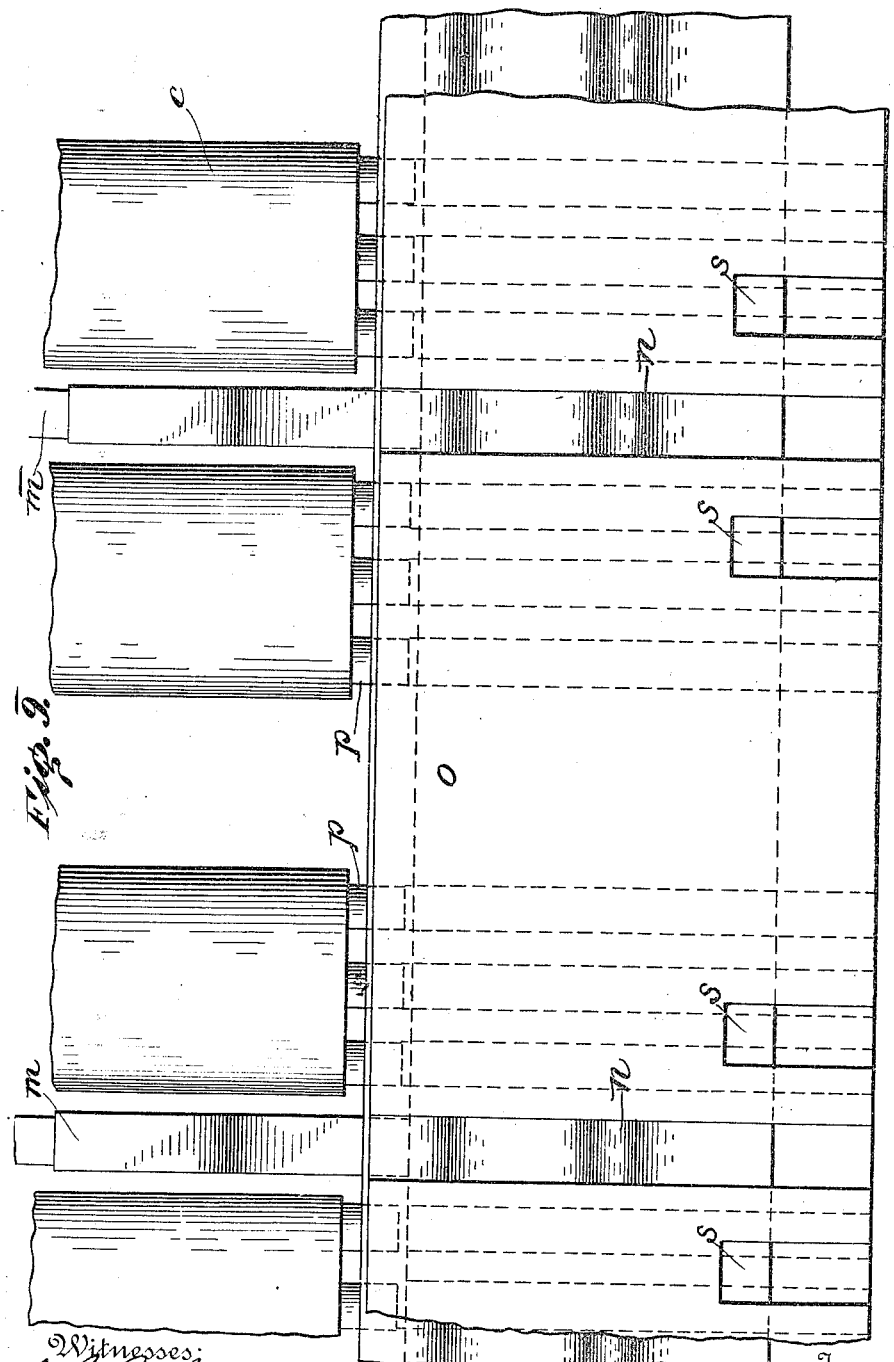

UNITED STATES PATENT OFFICE.

JOSEPH MISKO, OF NEW YORK, N. Y., ASSIGNOR TO D. W. McCORD, OF NEW YORK, N. Y.

METHOD OF MAKING RAIL-JOINTS.

1,041,503.  Specification of Letters Patent.  Patented Oct. 15, 1912.

Application filed January 20, 1912. Serial No. 672,306.

*To all whom it may concern:*

Be it known that I, JOSEPH MISKO, a citizen of the United States, and residing at New York city, New York, have invented a new and useful Improvement in Methods of Making Rail-Joints, of which the following is a specification.

The invention relates to the manufacture of rail joint plates having rail seating flanges, which are generally known in the trade as continuous joint plates, and which comprise an upright section which is wedged in between the head and flange of the rail and a lower base supporting portion, generally V-shaped in horizontal cross section, adapted to closely embrace the rail flanges.

While continuous joint plates of this character have long been known to the art, no simple and economical method of making the same has been devised. As heretofore practiced, the method of making continuous rail joint plates of this character has involved first, rolling a bar to a shape approximating the finished shape but having the V-shaped section open or with a greater angle between its rail seating base flange and its web portion, to facilitate subsequent shearing of the bar into lengths, then shearing the bar into lengths, and finally pressing each length to partially close the angle of the V-shaped section and shape the plate to a fit as nearly as possible. This operation is slow, tedious, costly and generally unsatisfactory, and is so uncertain in its results that it is the rule rather than the exception that each joint plate must be finished or fitted before it is applied to the rails. Moreover, the particular sequence of steps or operations indicated renders an intermediate heating of the separate rail joint sections necessary, which involves further elements of time and expense.

The object of the present invention is to provide an improved method and apparatus for manufacturing continuous rail joint plates, directly from the bloom and preferably at a single heat by rolling a continuous bar of the proper cross section, then cutting the bar into sections of the proper length to form the individual plates by shearing out chips from the continuous bar, while it is held in a stationary position, and finally punching and slotting the plates, preferably simultaneously with the cutting operation, as required for the bolts and spikes.

More particularly, the rolling operation consists, first in rolling from the hot ingot or bloom, a continuous bar approximating the cross section required to fit the rail, but with the V-shaped portion opened or spread at a much wider angle than that of the V-shaped section in the finished product, closing the section to an approximate fit by bending rolls, and finally passing the bar through finishing rolls which reduce the bar or section to its ultimate cross section to exactly fit the rails, the relation between the rolls and the section rolled being such that the center line of the V-section is at right angles to the axis of the male roller, so that the flange on the male roller which finishes the interior of the V-shaped section, finds sufficient clearance. To effect this result, the plate or bar is passed through the rolls in tilted or canted position so that the center line of the V-shaped section and the finishing flange on the male roller are substantially at right angles to the longitudinal axis of the latter.

The bars or plates having the exact cross section of continuous rail joint plates as thus turned out by the rolls are then preferably passed through straightening rolls, and thence to a bed or table where they are cut into lengths by shearing out chips or sections between adjacent plates and at the same time punching and slotting the several plates, while the bar is held immovable, the whole being preferably effected at a single heat and with extreme expedition and facility.

Figure 2:
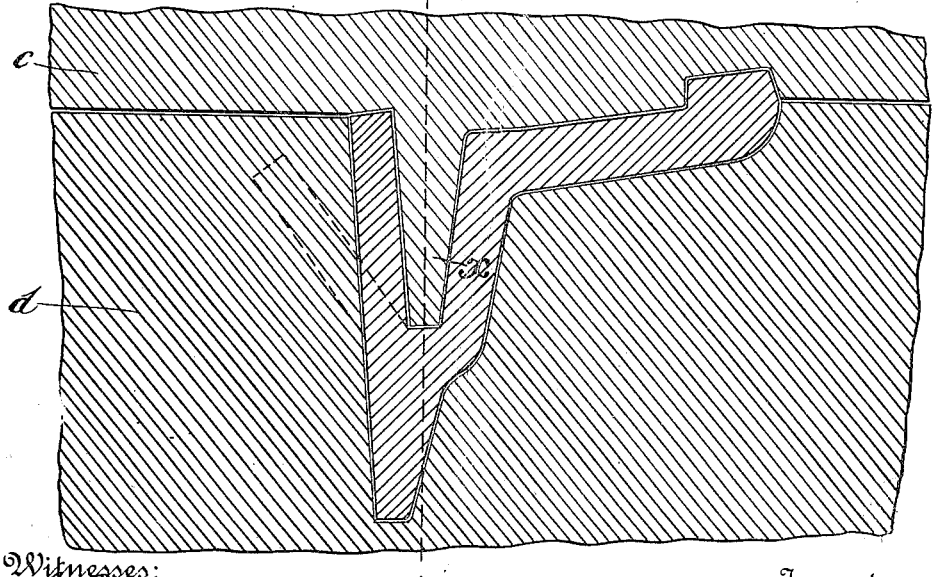

Means for effecting the production of continuous rail joints, in accordance with this invention are illustrated in the accompanying drawings, in which, Figure 1 is a fragmentary section through an intermediate pass of a rolling mill, showing a preliminary shape of the bar. Fig. 2 is a similar view showing the final or finishing pass of the rolls. Fig. 3 is a diagrammatic front elevation of the finishing pass illustrated in Fig. 2, and the bending rolls for closing the lower flange of the V-section, located in front of the finishing pass. Fig. 4 is a diagrammatic side elevation of the rolling mill, including the bending or closing rolls preceding the finishing pass, the straightening rolls behind the finishing pass and a smoothing roll for giving the ultimate finishing touch to the interior of the V-shaped section. Fig. 5 is a diagrammatic end view of a suitable cutting apparatus for shearing out chips and severing the finished bar into rail joint lengths. Fig. 6 is a side elevation illustrating a gang of such shears. Fig. 7 is a perspective view of a typical V-shaped section illustrating the mode of cutting out the chips between adjacent rail joint plates. Fig. 8 is a diagrammatic view showing the relation of the female die or bed for holding the continuous bar, the shear for severing it into lengths, the punch for providing the bolt holes and the slotter for cutting the spike slots. Fig. 9 is a side elevation of a section of the finishing machine, showing gangs of shears, punches and slotters.

In carrying out the first part of the invention, to wit, the rolling operation, a rolling mill of suitable type is employed, having an appropriate number of passes to reduce the hot billet or ingot to a section or bar of considerable length and having the exact cross section of a continuous rail joint plate. The preliminary passes of the rolls are such as to make the V-shaped section or base portion of the bar open or with divergent sides, as indicated in Fig. 1, the successive passes of the rolls effecting a gradual reduction of the metal until the cross section approximates that of the finished bar, say by one-hundredth of an inch, with the V-shaped section spread or open as illustrated in Fig. 1. This brings the bar up to the final or finishing pass, in which it is given the exact ultimate cross section necessary to cause it to accurately fit the rails.

In Fig. 1, $a$ and $b$ indicate the roll sections of the final pass in which the bar is reduced to approximately its ultimate thickness, but with the V-shaped section of the base open. After the section leaves the pass between rolls $a$ and $b$, it is delivered between bending rollers $e$ and $f$, located in advance of the final pass in roll sections $c$ and $d$, said bending rollers $e$ and $f$ serving to bend or close the bottom flange of the V-section into its final position, the extent of the bending operation necessary to effect this being indicated in Fig. 3, in which the dotted lines indicate the open position of the V-section and the full lines the final relation of the parts just before the passage through the finishing pass. Under ordinary conditions, it would be impossible to roll a V-shape section having the very acute angle which characterizes the flange embracing section of the continuous rail joint plate, if any material reduction of the thickness of the metal in the respective passes were attempted. To avoid this difficulty, therefore, the expedient of first rolling the bar with the V-section open has been found efficacious. As heretofore indicated, the former method of rolling continuous rail joint plates ended with the continuous bar, from which the individual plates were ultimately made, being run through the final pass of the rolls with the V-shaped base section spread or open. In other words, according to the former practice, the final reduction of the bar by the rolls was effected with a wide open V-shape and all of the subsequent operations were directed to working the individual rail joint plates, which were severed from the bar immediately after the rolling operation, into as near perfect form as was possible. The reason that the bar was not rolled to its ultimate shape and thickness was due to the fact that it was not regarded as feasible or practicable to roll a section having a very acute reentrant angle like the V-section of such continuous joint plate. According to the present invention, however, the rolling of the continuous length bar in its ultimate form and thickness throughout is not only practical, but economical, and is effected, as indicated, by first rolling the bar to approximately its ultimate thickness with the V-shaped base section open, which provides ample clearance for the ribs and flanges on the male rolls, then bending the distorted base flange of the V-section into its proper position by passing it through bending rollers $e$ and $f$ just preceding the final pass of the mill, indicated by the roll sections $c$, $d$ of Fig. 4. As the bar leaves the rolls $e$, $f$, its thickness throughout is about one-hundredth of an inch greater than that of the finished section, so that in passing through the finishing rolls $c$, $d$, there will be a draft of approximately one-hundredth of an inch between the rolls and the bar which represents the final reduction of the cross section of the bar by said finishing rolls. But even this amount of reduction by the rolls would be impractical unless special provision were made to allow clearance between the interior of the V-shaped section of the bar and the forming flange on the male roller, for the reason that without such clearance, the male roller would be hopelessly damaged, due to the heavy friction, or the bar would be bent and twisted and the metal thereof disrupted. According to the present invention, however, these difficulties are overcome by finishing the pass between the rollers $c$, $d$, so that the bar will be tilted or canted with respect to the axis of the rolls, so as to dispose the center line of the V-shaped section of the bar at right angles to the longitudinal axis of the roll $c$. This will enable the forming flange $w$ on the roll $c$ to be so constructed that its transverse axis is substantially at right angles to the longitudinal axis of the roll and the lateral faces of said flange are substantially symmetrically disposed with respect to the central longitudinal plane of the flange represented by the dotted line $g$ in Fig. 3. As indicated, with this disposition of the final pass through the rolls $c$, $d$, the continuous bar is given its final reduction and ultimate shape by the rolls before the rail joint plates are separately cut from the bar.

It is a recognized fact in rolling irregular shapes, that the least inequality of draft on one side or the other of the rolled section when passing through the rolls will result in a bending of the said section, and in order to meet and overcome this difficulty, it is found desirable to employ a series of straightening rolls behind the finishing roll sections $c$, $d$, as indicated by rolls $j$, $k$ in Fig. 4, which serve to take out any kink or bend in the bar and turn the same out perfectly straight and true throughout its length. In order to insure an absolutely true and perfect contour to the interior of the V-shaped section of the bar so that it will snugly fit and embrace the bottom flange of the rail without further treatment, it is found desirable to place near the end of the straightening rolls $j$, $k$ a smoothing roll $l$, which is provided with a rib or tongue conforming exactly to the interior of the V-shaped section, and which therefore serves to smooth out said interior, removing any possible inequalities and likewise serving as a final guide to the bar as it leaves the rolling mill. This final smoothing roller will also correct any damage done to the V-shaped section by the straightening rolls. The long bar emerging from the series of rolls is thereby turned out perfect in shape, straight, and finished, and adapted to fit accurately the rails to which it is ultimately to be applied in the form of plate sections.

The operation as described is carried out at a single heat, and in fact, the reduction of the bar to its ultimate shape may be effected with such expedition that it leaves the final rollers at a red heat and under the most favorable circumstances for the final operations necessary to reduce it to continuous rail joint plates and without the necessity of further heating. After the bar leaves the rolls, it is delivered upon a bed or table $o$, which is provided with a longitudinal groove or die section $o'$ conforming to the shape of the exterior of the bar, as indicated in Fig. 8. This table is sufficiently long to receive the bar and support it throughout its length and hold it firm and immovable during the specific operations of shearing, punching and slotting to produce the rail joint plates ready for use. Preferably, the shearing, punching and slotting is done simultaneously, so that a number of finished continuous rail joint plates are turned out at one operation.

The shearing of the bar into several plates by one operation is of material advantage over the old practice, in which individual plates were separately sheared from the end of the bar, as the latter was advanced, first, because it affords no opportunity for the bar to cool at any part of its length to an appreciable degree, and second, because the peculiar shearing operation is effected while the bar is absolutely stationary and under conditions which will preclude the formation of any bur or irregularity at the sheared sections. This operation is effected by means of a gang or series of shearing blades $m$, which operate in vertical slots $n$ running transversely of the bed $o$ so that when the blades are brought down by suitable mechanism, they shear out a chip of metal which curls outwardly on both sides of the V-section until it is finally severed from the body of the bar at the apex of the V-section, leaving the lines of cleavage free from any bur or roughness. This shearing operation is schematically illustrated in Figs. 5, 6 and 7. Although the shearing results in a slight waste of metal from the bar, represented by the chip, yet the effect of producing a perfectly clear cut through the V-shaped section more than offsets the loss represented by the metal in the chip, which latter, moreover, can be subsequently used.

Associated with the shearing blades are a series of punches $p$, operated by any suitable mechanism, each of which coöperates with a suitable die opening in the bed $o$ and which serve to punch the bolt holes at appropriate intervals in the web of the rail joint plate. Correspondingly, a series of slotting blades $s$ coöperates with recesses $s'$ in the lower face of the bed $o$ and are actuated by appropriate mechanism to shear out slots in the edge of the flange of the individual plate sections to receive the spikes by means of which the rail joint plates are secured to the ties.

It is not considered necessary to illustrate the particular mechanism for operating the shearing, punching and slotting devices, for the reason that the same may be given any convenient form which good practice may dictate.

By means of the apparatus and method hereinbefore described, a white hot ingot or bloom is reduced by rolling into a bar having the finished cross section of a continuous rail joint plate adapted to accurately fit the rail without further machining, and before it cools down below a red heat, after leaving the rolls, it is cut into proper lengths to form such rail joint plates and punched and slotted for the bolt holes and spike slots, so that the finished continuous rail joint plates are turned out rapidly and at a single heat in condition to be applied to their intended use with the absolute assurance that they will produce a perfect fit and require no further operation by the rail layer, other than the proper placing of the bolts and spikes. Continuous rail joint plates produced by this method are absolutely true to shape and fit, are without burs or inequalities of any kind and can be produced at a cost not to exceed that of ordinary commercial rolled shapes, such as angle bars, I-beams, and the like, of the same relative sizes and weights. While the simultaneous shearing, punching and slotting of the individual plates from the continuous bar is economical and desirable, obviously the invention is not limited to such simultaneous operation, for the reason that the separate operations indicated might be performed independently, or the plates might be separately sheared from the bar without departing from the spirit of the invention.

What I claim is:—

1. The method of manufacturing continuous rail joint plates having rail seating flanges, which consists in first rolling from the hot ingot or bloom a continuous bar only approximating the cross section required to fit the rail, then rolling the same into its final form or exact cross section, by subjecting it to the rolling action while it is so held that the center line of the V-section is at right angles to the axis of the roll, and finally cutting the bar into plate sections of proper length; substantially as described.

2. The method of manufacturing continuous rail joint plates having rail seating flanges, which consists in first rolling from the hot ingot or bloom a continuous bar only approximating the cross section required to fit the rail and having the V-section formed by the base substantially open or divergent, then rolling the divergent V-section to close the same to the desired extent, then rolling the bar into its final form or exact cross section, by subjecting the same to the rolling action while it is so held that the center line of the V-section is at right angles to the axis of the roll, and finally cutting the bar into plates of proper length; substantially as described.

3. The method of manufacturing continuous rail joint plates having rail seating flanges, which consists in first rolling from the hot ingot or bloom a continuous bar only approximating the cross section required to fit the rail and having the V-section formed by the base substantially open or divergent, then rolling the divergent V-section to close the same to the desired extent, then rolling the bar into its final form or exact cross section, by subjecting the same to the rolling action while it is so held that the center line of the V-section is at right angles to the axis of the roll, cutting the bar into plates of proper length, and finally punching and slotting the plates as required for the fastening bolts and spikes; substantially as described.

4. The method of manufacturing continuous rail joint plates having rail seating flanges, which consists in first rolling from the hot ingot or bloom a continuous bar of the proper cross section to fit the rail, cutting said bar into sections of proper length by shearing out chips from the continuous bar and simultaneously punching and slotting the same as required for bolts and spikes, while the bar is held in stationary position; substantially as described.

5. The method of manufacturing continuous rail joint plates having rail seating flanges, which consists in first rolling from the hot ingot or bloom a continuous bar only approximating the cross section required to fit the rail and having the V-section formed by the base substantially open or divergent, then rolling the divergent V-section to close the same to the desired extent, then rolling the bar into its final form or exact cross section by subjecting the same to the rolling action while it is so held that the center line of the V-section is at right angles to the axis of the roll, and then simultaneously punching and slotting the bar as required for bolts and spikes and cutting the same into sections of proper length by shearing out chips therefrom while the said bar is held in a stationary position and is still hot from its initial heat; substantially as described.

6. The method of manufacturing continuous rail joint plates having rail seating flanges, which consists in rolling a bar having therein an open V-section the walls of which are slightly thicker than those of the finished section, rolling the bar to close the section to its final position, further rolling the bar in tilted position with respect to the roll so that the center line of the V-section is at right angles to the axis of the roll, and thereafter cutting the bar into plates of proper length.

7. The method of manufacturing bars for continuous rail joint plates, which consists in first rolling from the hot ingot or bloom, a continuous bar approximating the cross section required to fit the rail and having the V-section formed by the base substantially open or divergent, then rolling the divergent V-section to close the same to the desired extent, and finally rolling the bar into its final form or exact cross section by subjecting the same to the rolling action while it is so held that the center line of the V-section is at right angles to the axis of the roll.

8. The method of manufacturing bars for continuous rail joint plates, which consists in rolling a bar having therein an open V- section, the walls of which are slightly thicker than those of the finished section, further rolling the bar to close the section to its final position, and finally rolling the bar in tilted position with respect to the roll, so that the center line of the V-section is at right angles to the axis of the roll.

In testimony whereof, I have signed my name to this specification in the presence of two subscribing witnesses, this 18th day of January 1912.

JOSEPH MISKO.

Witnesses:
C. S. SMITH,
H. J. MURRAY.